(12) United States Patent
Kawai (10) Patent No.: US 8,396,433 B2
(45) Date of Patent: Mar. 12, 2013

(54) RADIO COMMUNICATION APPARATUS AND DC OFFSET ADJUSTMENT METHOD

(75) Inventor: Masahiro Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 482 days.

(21) Appl. No.: 12/742,577

(22) PCT Filed: Oct. 28, 2008

(86) PCT No.: PCT/JP2008/069489
§ 371 (c)(1),
(2), (4) Date: May 12, 2010

(87) PCT Pub. No.: WO2009/075144
PCT Pub. Date: Jun. 18, 2009

(65) Prior Publication Data
US 2010/0273439 A1    Oct. 28, 2010

(30) Foreign Application Priority Data

Dec. 10, 2007    (JP) .................................. 2007-318444

(51) Int. Cl.
*H04B 1/04* (2006.01)
(52) U.S. Cl. ......... 455/113; 375/296; 375/297; 375/298
(58) Field of Classification Search .................. 455/113; 375/296, 297, 298
See application file for complete search history.

(56) References Cited

U.S. PATENT DOCUMENTS

| | | | | |
|---|---|---|---|---|
| 4,852,123 A * | 7/1989 | Bickley et al. | ................ | 375/223 |
| 5,142,552 A * | 8/1992 | Tzeng et al. | .................. | 375/232 |
| 5,631,898 A * | 5/1997 | Dent | ............................. | 370/203 |
| 6,606,483 B1 * | 8/2003 | Baker et al. | .................... | 455/126 |
| 6,925,108 B1 * | 8/2005 | Miller et al. | ................... | 375/150 |
| 7,079,604 B1 * | 7/2006 | Miller et al. | ................... | 375/343 |
| 7,274,750 B1 * | 9/2007 | Mueller | ......................... | 375/297 |
| 8,073,074 B2 * | 12/2011 | Waheed et al. | ............... | 375/297 |
| 2001/0010713 A1 * | 8/2001 | Yamamoto | ..................... | 375/297 |
| 2003/0076570 A1 * | 4/2003 | Schemmann et al. | ........ | 359/189 |
| 2003/0134607 A1 * | 7/2003 | Raghavan et al. | ............ | 455/132 |
| 2007/0275674 A1 * | 11/2007 | Chien | .......................... | 455/90.2 |

(Continued)

FOREIGN PATENT DOCUMENTS

JP    06-244892 A    9/1994
JP    2001-103104 A    4/2001

(Continued)

OTHER PUBLICATIONS

International Search Report for PCT/JP2008/069489, mailed Jan. 6, 2009.

*Primary Examiner* — Temesgh Ghebretinsae
*Assistant Examiner* — Richard Chan (57) ABSTRACT

At a transmitting side, during carrier leak adjustment, quadrature modulation means uses a carrier wave having a frequency different from that at a receiving side to quadrature-modulate an outgoing signal. Feedback means feeds a modulated wave resulting from the quadrature modulation back to the receiving side. At the receiving side, quadrature demodulation means quadrature-demodulates the fed back modulated wave. Phase locking means locks the phase of the signal resulting from the quadrature demodulation to match the phase to the phase at the transmitting side. Offset detection means time-averages the phase-locked signal to detect a direct-current offset. At the transmitting side, based on the value of the direct-current offset detected at the receiving side, offset adjustment means corrects a direct-current offset of the outgoing signal to be quadrature-modulated.

13 Claims, 8 Drawing Sheets

U.S. PATENT DOCUMENTS

| | | | |
|---|---|---|---|
| 2008/0025381 A1* | 1/2008 | Lee et al. | 375/219 |
| 2011/0280338 A1* | 11/2011 | Mochizuki | 375/297 |
| 2012/0155572 A1* | 6/2012 | Kim et al. | 375/297 |
| 2012/0206201 A1* | 8/2012 | Mizokami et al. | 330/254 |
| 2012/0257656 A1* | 10/2012 | Kang et al. | 375/221 |
| 2012/0264380 A1* | 10/2012 | Cobley | 455/77 |

FOREIGN PATENT DOCUMENTS

| | | |
|---|---|---|
| JP | 3221326 B | 10/2001 |
| JP | 2005-217911 A | 8/2005 |
| JP | 2005-223622 A | 8/2005 |
| JP | 2006-136028 A | 5/2006 |
| JP | 2007-208380 A | 8/2007 |
| WO | 2004/023667 A | 3/2004 |
| WO | 2005/002063 A | 1/2005 |
| WO | 2005/025168 A | 3/2005 |
| WO | 2006/072973 A | 7/2006 |
| WO | 2007/020711 A | 2/2007 |

* cited by examiner

Fig. 10

RADIO COMMUNICATION APPARATUS AND DC OFFSET ADJUSTMENT METHOD

This application is the National Phase of PCT/JP2008/069489, filed on Oct. 28, 2008, which is based upon and claims the benefit of priority from the prior Japanese Patent Application No. 2007-318444, filed on Dec. 10, 2007, the entire contents of which are incorporated herein by reference.

TECHNICAL FIELD

The present invention relates to a technique for correcting DC offsets associated with modulation.

BACKGROUND ART

Some radio communication apparatuses use quadrature modulation such as QAM (Quadrature Amplitude Modulation).

Many modulation schemes that use digital circuit technology use analog circuits for quadrature modulation. Since baseband analog signals are input into the quadrature modulator, the input signals inevitably include offsets such as amplitude offsets and direct current (DC) offsets.

When a signal input into I/Q inputs of a quadrature modulator in a radio communication apparatus that uses quadrature modulation includes a DC offset, the quadrature modulator outputs the DC offset as a carrier component. The carrier component remains as carrier leak and has adverse effects on communication performance such as reduction of reception sensitivity. In the worst case, carrier leak can cause a modulated wave to fail to meet specifications.

To prevent this, a technique for correcting a DC offset in a radio communication apparatus to reduce carrier leak (see JP 2007-208380A) has been proposed. JP2007-208380A discloses a radio communication apparatus in which a wave modulated by a quadrature modulator at a transmitting side is fed back to a receiving side in the radio communication apparatus, a DC offset value is calculated from the modulated wave at the receiving side, and a signal to be input into the quadrature modulator at the transmitting side is corrected on the basis of the calculated DC offset value.

DISCLOSURE OF THE INVENTION

At the transmitting side of a radio communication apparatus, DC offsets are generated mostly in a stage where a digital signal is converted to an analog signal and input into the quadrature modulator. A modulated wave is fed back from the transmitting side to a receiving side and a DC offset detected at the receiving side is corrected at the transmitting side in order for the transmitting side itself to correct the DC offset generated at the transmitting side.

However, in the configuration disclosed in JP2007-208380A which uses the feedback, the sum of a DC offset generated at the transmitting side and a DC offset generated in another stage may be corrected at the transmitting side. For example, in a radio communication apparatus in which the quadrature demodulator of the receiving side as well as the quadrature modulator at the transmitting side is an analog circuit, a DC offset is also generated in a stage where an analog signal output from the quadrature demodulator at the receiving side is converted to a digital signal.

However, the radio communication apparatus disclosed in JP2007-208380A does not distinguish a DC offset generated at the transmitting side from a DC offset generated in another stage. Accordingly, an input signal input to the quadrature modulator at the transmitting side is adjusted by using the sum of a DC offset generated at the transmitting side and a DC offset generated at the receiving side. Accordingly, a large adjustment error can result.

In another method, a measuring circuit such as a spectrum analyzer is used instead of a receiving-side circuit to measure a modulated wave generated at the transmitting side while a DC offset is manually corrected. The method requires much time for adjusting each individual apparatus and increases costs.

An object of the present invention is to provide a radio communication apparatus and a DC offset adjustment method capable of readily correcting a DC offset generated at a transmitting side.

To achieve the object, a radio communication apparatus according to one aspect of the present invention includes:

quadrature modulation means for quadrature-modulating an outgoing signal by using a carrier wave with a frequency different from a frequency at a receiving side during carrier leak adjustment;

feedback means for feeding a modulated wave resulting from quadrature modulation by the quadrature modulation means back to the receiving side;

quadrature demodulation means for quadrature-demodulating the modulated wave fed back by the feedback means;

phase locking means for locking a phase of a signal resulting from quadrature demodulation by the quadrature demodulating means to match the phase to phase at the transmitting side;

offset detection means for detecting a direct-current offset by time-averaging the signal with a phase locked by the phase locking means; and first offset adjustment means for, on the basis of the value of the direct-current offset detected by the offset detection means, correcting a direct-current offset of the outgoing signal to be quadrature-modulated by the quadrature modulation means.

A DC offset adjustment method for adjusting a DC offset within an apparatus according to another aspect of the present invention includes:

at a transmitting side, quadrature-modulating an outgoing signal by using a carrier wave having a frequency different from a frequency at a receiving side during carrier leak adjustment; and feeding a modulated wave resulting from the quadrature modulation back to the receiving side;

at the receiving side, quadrature-demodulating the fed back modulated wave;

locking a phase of a signal resulting from the quadrature demodulation to match the phase of the signal to a phase at the transmitting side; and detecting a direct-current offset by time-averaging the phase locked signal; and at the transmitting side, correcting, on the basis of the value of the direct-current offset detected at the receiving side, a direct-current offset of the outgoing signal to be quadrature-modulated.

BEST MODE FOR CARRYING OUT THE INVENTION

An exemplary embodiment of the present invention will be described in detail with reference to drawings.

Figure 1:
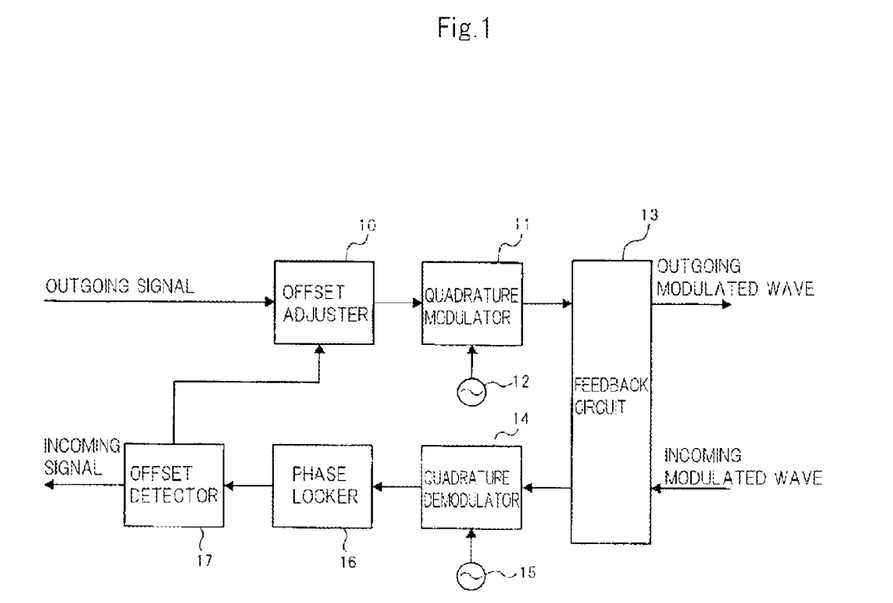
FIG. 1 is a block diagram illustrating a configuration of a radio communication apparatus according to an exemplary embodiment.

FIG. 1 is a block diagram illustrating a configuration of a radio communication apparatus according to an exemplary embodiment. Referring to FIG. 1, the radio communication apparatus includes offset adjuster 10, quadrature modulator 11, and local oscillator 12 at its transmitting side and includes quadrature demodulator 14, local oscillator 15, phase locker 16, and offset detector 17 at its receiving side. The radio communication apparatus further includes feedback circuit 13 feeding back an outgoing modulated wave to a receiving side and has the function of correcting a DC offset generated at the transmitting side on the basis of the value of a DC offset detected at the receiving side. The DC offset adjustment will be hereinafter referred to as "carrier leak adjustment".

Offset adjuster 10 adjusts a DC offset of an outgoing signal input into quadrature modulator 11 on the basis of the value of a DC offset detected by offset detector 17 at the receiving side during carrier leak adjustment.

Quadrature modulator 11 quadrature-modulates the input outgoing signal by using a carrier wave from local oscillator 12 and outputs a resulting modulated outgoing wave. The modulated outgoing wave output from quadrature modulator 11 is input into feedback circuit 13.

Local oscillator 12 generates a carrier wave used in quadrature modulation at quadrature modulator 11. Local oscillator 12 is a variable-frequency oscillator which outputs a carrier wave having a frequency that varies depending on whether or not the outgoing modulated wave is to be fed back for carrier leak adjustment before transmission to its destination. The frequency of a carrier wave to be sent to the destination without modulated-wave feedback is a normal communication frequency which is the same as that of a carrier wave generated by local oscillator 15 at the receiving side. On the other hand, the frequency for carrier leak adjustment differs from the frequency used in normal communication by a predetermined value.

Feedback circuit 13 feeds an outgoing modulated wave provided from quadrature modulator 11 at the transmitting side back to quadrature demodulator 14 at the receiving side when carrier leak adjustment is performed.

Quadrature demodulator 14 quadrature-demodulates a modulated wave provided from feedback circuit 13 by using a carrier wave from local oscillator 15 and sends the resulting demodulated signal to phase locker 16. An incoming signal input to phase locker 16 when an outgoing modulated wave is fed back by feedback circuit 13 for carrier leak adjustment may potentially contain, in addition to a DC offset generated at an input to quadrature modulator 11 at the transmitting side, a DC offset generated in another stage.

Phase locker 16 locks the phase of an input signal to match the phase to phase at the transmitting side and inputs the resulting signal into offset detector 17.

Offset detector 17 time-averages the signal from phase locker 16 to detect a DC offset and notifies the value of the DC offset to offset adjuster 10 at the transmitting side. Since the phase of a DC offset component generated at the transmitting side is locked by phase locker 16, the component is not lost by time averaging and is detected by offset detector 17.

In the present exemplary embodiment, the frequency of local oscillator 12 at the transmitting side and the frequency of local oscillator 15 at the receiving side are set to values different from each other and an outgoing modulated wave output from quadrature modulator 11 at transmitting side is fed back to quadrature demodulator 14 at the receiving side. At the receiving side, phase locker 16 locks the phase of the output from the quadrature demodulator 14 and offset detector 17 time-averages the output from the phase locker 17 to detect a DC offset generated at the transmitting side. At the transmitting side, the DC offset of the input of quadrature modulator 11 detected by the offset detector 17 is corrected. Specifically, the quadrature modulation frequency at the transmitting side is set to a value different from the quadrature modulation frequency at the receiving side, the phase of a quadrature-modulated signal is locked and the time average is calculated to detect a DC offset. Based on the detected DC offset, a DC offset of an input into the quadrature modulation at the transmitting side is corrected. Thus, according to the present invention, a DC offset generated at the transmitting side can be readily corrected.

The radio communication apparatus according to the present exemplary embodiment may further include a controller which controls the sequence of the frequency conversion by local oscillator 12 at the transmitting side, the setting of feedback at feedback circuit 13, and the notification of a DC offset detected by offset detector 17 at the receiving side to offset adjuster 10 at the transmitting side.

Another offset adjuster may be provided between quadrature modulator 15 and phase locker 16 of the present exemplary embodiment. The offset adjuster may calculate the time average of signals from quadrature modulator 15 to detect a DC offset and correct the DC offset. Since the frequency of local oscillator 12 at the transmitting side and the frequency of local oscillator 15 at the receiving side differ from each other, the phase of a DC offset generated at the transmitting side rotates before the phase is locked by phase locker 16. By correcting the DC offset by using the time-average value at this stage, the DC offset with the phase locked in the phase of the carrier wave of local oscillator 15 at the receiving side can be removed in advance.

Phase locker 16 of the present exemplary embodiment may be a carrier recovery circuit implemented by a PLL (Phase-Locked Loop), for example. Offset detector 17 may be an offset adjustment circuit for correcting a DC offset of a signal after carrier recovery. In that case, offset detector 17 (offset adjustment circuit) itself may correct a DC offset and notify the corrected value to offset adjuster 10. This can eliminate the need for provision of a dedicated measuring circuit for DC offset adjustment at the transmitting side of the radio communication apparatus, preventing increase of the circuit size.

Offset adjuster 10, quadrature modulator 11, quadrature demodulator 14, the PLL implementing phase locker 16, and offset adjustment circuit implementing offset detector 17 may be implemented as an integrated circuit and DC offset adjustment may be performed by digital processing.

While the present exemplary embodiment has been described with respect to an example in which variable-frequency local oscillator 12 is provided at the transmitting side and local oscillator 12 generates a carrier wave with a frequency different from the frequency of a carrier wave generated by local oscillator 15 at the receiving side during carrier leak adjustment, the present invention is not limited to this. A local oscillator for normal operation and a local oscillator for carrier leak adjustment may be provided at the transmitting side and switching may be made between the two local oscillators.

While the present exemplary embodiment has been described with respect to an example in which the frequency of a carrier wave at the transmitting side is changed when carrier leak adjustment is performed, the present invention is not limited to this. The frequency of a carrier wave at the receiving side may be changed when charier leak adjustment is performed.

FIRST EXAMPLE

Specific examples of the present exemplary embodiment will be described.

Figure 2:
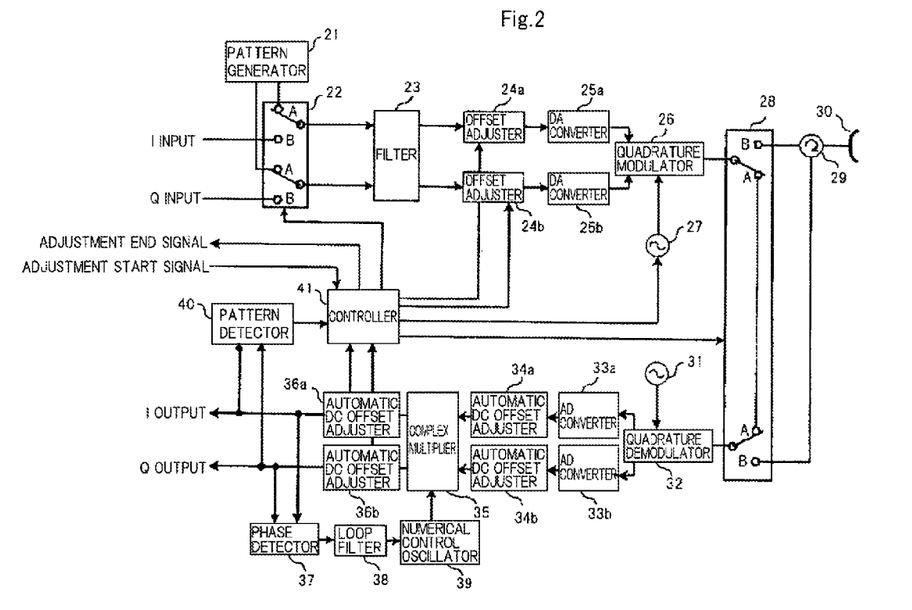
FIG. 2 is a block diagram illustrating a configuration of a radio communication apparatus in a first example.

FIG. 2 is a block diagram illustrating a configuration of a radio communication apparatus in a first example. Referring to FIG. 2, the radio communication apparatus includes pattern generator 21, switch 22, filter 23, offset adjusters 24a and 24b, DA converters 25a and 25b, quadrature modulator 26, local oscillator 27, switch 28, directional coupler 29, antenna 30, local oscillator 31, quadrature demodulator 32, AD converters 33a and 33b, automatic DC offset adjusters 34a and 34b, complex multiplier 35, automatic DC offset adjusters 36a and 36b, carrier phase detector 37, loop filter 38, numerical control oscillator 39, pattern detector 40, and controller 41.

Pattern generator 21 outputs a predetermined test signal during carrier leak adjustment. The test signal has, for example, a random pattern without a DC component. It is assumed in the present example that the QAM modulation scheme is used. Accordingly, pattern generator 21 outputs I and Q signals, which can be obtained by QAM mapping of pattern data. The signals are modulated at the transmitting side of the radio communication apparatus and demodulated at the receiving side of the radio communication apparatus. Therefore, preferably a known signal sequence whose pattern can be detected at the receiving side is used as the pattern data. For example, preferably a pseudorandom number signal such as an M sequence is used and is QAM mapped. Signals output from pattern generator 21 are coupled to switch 2.

A signal input into the radio communication apparatus and a signal from pattern generator 21 are coupled to switch 22, which selects and outputs one of the signals according to a control signal from controller 41. Switch 22 selects a signal input from an external source into the radio communication apparatus during normal communication and selects a signal provided from pattern generator 21 during carrier leak adjustment. In FIG. 2, switch 22 is in the carrier leak adjustment position. That is, position A is selected.

Filter 23 shapes the waveform of a signal input through switch 22 and outputs the resulting signal. Since filter 23 determines the shape of the transmission spectrum, a filter having a property that provides a spectrum shape required by the system is used as filter 23. Typically, a digital filter is used. The shape of spectrum can be determined by controlling the tap coefficient of the digital filter. The outputs of filter 23 are connected to offset adjusters 4.

Offset adjusters 24a and 24b have the function of imparting a DC offset to a signal from filter 23. Offset adjuster 24a is used for an I channel whereas offset adjuster 24b is used for a Q channel. Offset adjusters 24a and 24b have the same configuration but adjust DC offsets of I and Q channels independently of each other. Accordingly, separate DC offset signals are input from controller 41 into offset adjusters 24a and 24b.

Figure 3:
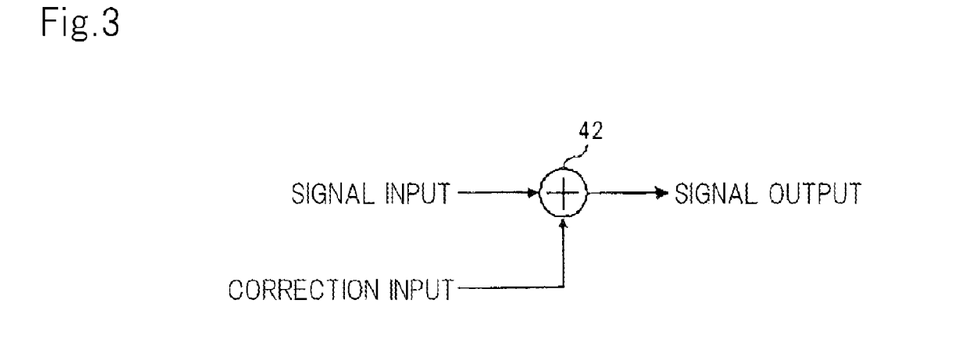
FIG. 3 is a diagram illustrating a specific configuration of an offset adjuster 24.

FIG. 3 illustrates a specific configuration of offset adjuster 24. Referring to FIG. 3, adder 42 adds a signal from filter 23 (SIGNAL INPUT in FIG. 3) and a DC offset signal (CORRECTION INPUT in FIG. 3) from controller 41 together. The addition cancels the DC offset contained in the input of quadrature modulator 26.

DA converters 25a and 25b convert digital signals from offset adjusters 24a and 24b, respectively, to analog signals and send the analog signals to quadrature modulator 26. DA converter 25a is used for the I channel whereas DA converter 25b is used for the Q channel.

Quadrature modulator 26 uses a carrier wave from local oscillator 27 to quadrature-modulate analog baseband signals resulting from DA (digital-analog) conversion by DA converters 25a and 25b.

Local oscillator 27 generates a carrier wave used for quadrature modulation. Local oscillator 27 is a variable-frequency oscillator oscillating at an oscillating frequency during carrier leak adjustment that differs from an oscillating frequency in normal operation. Local oscillator 27 oscillates normally at the same IF (Inter-Frequency) $\omega c$ as local oscillator 31 at the receiving side. During carrier leak adjustment, on the other hand, local oscillates 27 oscillates at a frequency different from the frequency at which local oscillator 31 oscillates by a differential frequency $\omega 1$, i.e. at a frequency of $(\omega c + \omega 1)$ or $(\omega c - \omega 1)$. The differential frequency $\omega 1$ is a deviation in carrier frequency of an input into the PLL that performs carrier recovery at the receiving side during carrier leak adjustment. Therefore, differential frequency $\omega 1$ is set to a small value with respect to the capture range of the PLL at the receiving side so that the PLL can capture the frequency.

Switch 28 changes its position between carrier leak adjustment operation and normal operation according to a control signal from controller 41. For carrier leak adjustment, switch 28 selects position A to feed back a signal from quadrature modulator 26 at the transmitting side to the quadrature demodulator 32 at the receiving side. For normal operation, on the other hand, switch 28 selects position B to transmit a signal from quadrature modulator 26 through antenna 30 and to input a signal received at antenna 30 to quadrature demodulator 32.

Directional coupler 29 is provided between switch 28 and antenna 30 to couple and decouple a signal of the transmitting side and a signal of the receiving side.

Antenna 30 is a transmitting and receiving antenna which is connected to directional coupler 29.

Local oscillator 31 generates a carrier wave having a frequency $\omega c$ to be used in quadrature demodulation.

Quadrature demodulator 32 quadrature-demodulates a signal from switch 28 by using a carrier wave from local oscillator 31. An I signal output from quadrature demodulator 32 is sent to AD converter 33a whereas a Q signal is sent to AD converter 33b.

AD converters 33a and 33b A-D (analog-digital) convert analog baseband signals of two channels, I and Q, respectively, resulting from quadrature demodulation by quadrature demodulator 32 to digital signals. AD converter 33a is used for the I channel and AD converter 35b is used for the Q channel.

Automatic DC offset adjusters 34*a* and 34*b* receive signals from AD converters 33*a* and 33*b*, respectively. Signals input in automatic DC offset adjusters 34*a* and 34*b* during carrier leak adjustment contain DC offsets generated at the transmitting side and DC offsets generated at the receiving side. Automatic DC offset adjusters 34*a* and 34*b* mainly correct DC offsets generated at the receiving side.

Figure 4:
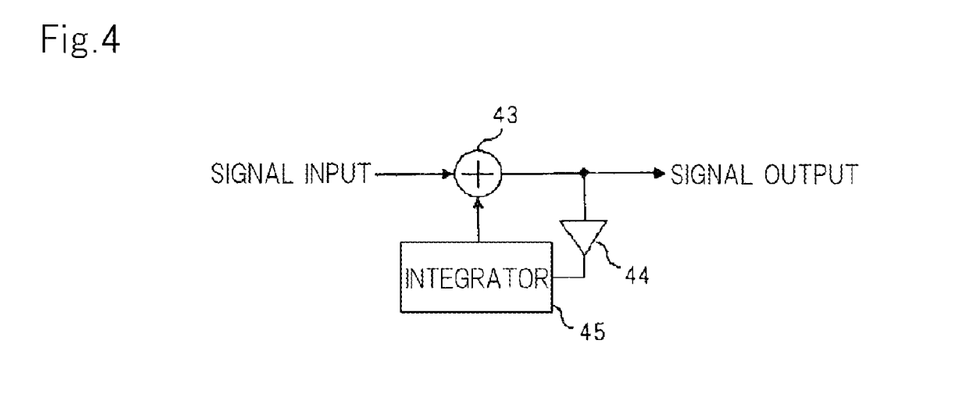
FIG. 4 is a diagram illustrating a specific configuration of an automatic DC offset adjuster 34.

FIG. 4 illustrates a specific configuration of automatic DC offset adjuster 34. Referring to FIG. 4, gain adjuster 44 which receives a signal input through adder 43 and integrator 45 which receives an output from gain adjuster 44 detect a DC offset, which is a time-average value. The signal of the DC offset is output from integrator 45 to adder 43.

During carrier leak adjustment, the frequency of local oscillator 27 at the transmitting side and the frequency of local oscillator 32 at the receiving side differ from each other and therefore a DC offset component generated at the transmitting side appears at the inputs of offset adjusters 34*a* and 34*b* as components with rotated phases. The components with rotated phases are negated by time-averaging.

Adder 43 adds a signal (SIGNAL INPUT in the figure) from AD converter 33 and a signal equivalent to a DC offset from integrator 45 together.

Since the signal input is a random signal, the average value of the signal would be 0 if the signal did not contain a DC offset. However, if the signal contains a DC offset, the average will deviate from 0. The deviation is detected by integrator 45. A DC offset contained in the signal input that has been generated at the receiving side appears in the average value and therefore is negated whereas a DC offset generated at the transmitting side is not corrected but remains.

The correction time constant at automatic DC offset adjuster 34 can be determined by controlling the amplitude of the signal input from gain adjuster 44 to integrator 24.

Complex multiplier 35, carrier phase detector 37, loop filter 38 and numerical control oscillator 39 constitute a carrier recovery PLL.

Carrier phase detector 37 detects a carrier phase shift (phase error) from the positions of signal points of signals output from automatic DC offset adjusters 36*a* and 36*b*. Loop filter 38 integrates phase errors detected by carrier phase detector 17 to detect a frequency drift amount. A signal indicating the frequency drift amount detected by loop filter 38 is input into numerical control oscillator 39. Numerical control oscillator 39 oscillates at a frequency indicated by the signal input from loop filter 38. Numerical control oscillator 39 outputs a sine wave signal and a cosine wave signal required by the complex multiplier 35. Complex multiplier 35 uses a signal (phase rotation signal) from numerical control oscillator 39 to impart phase rotation to input signals from automatic DC offset adjusters 34*a* and 34*b*, thereby locking the carrier phase.

Automatic DC offset adjusters 36*a* and 36*b* have the same configuration as automatic DC offset adjusters 34*a* and 34*b* illustrated in FIG. 4. However, automatic DC offset adjusters 36*a* and 36*b* differ from automatic DC offset adjusters 34*a* and 34*b* in that automatic DC offset adjusters 36*a* and 36*b* send signals of DC offsets output from integrator 45 to controller 41 as well. Automatic DC offset adjusters 36*a* and 36*b* correct DC offsets contained in outputs from complex multiplier 35 and output corrected I and Q signals to the outside world and also send them to pattern detector 40 and carrier phase detector 37.

Pattern detector circuit 40 detects a signal sent from pattern generator 21 at the transmitting side from outputs from automatic DC offset adjusters 36*a* and 36*b* during carrier leak adjustment to obtain a carrier recovery phase and sends it to controller 41. This can eliminate uncertainty of the carrier recovery phase in quadrature demodulation.

Controller 41 controls operations of the components described above. During carrier leak adjustment, controller 41 controls operations of the components according to a predetermined procedure. Input into controller 41 are a trigger signal (adjustment start signal) for initiating carrier leak adjustment, a signal indicating a carrier recovery phase sent from pattern detector 40 and signals indicating DC offset control values sent from automatic DC offset adjusters 16. Controller 41 initiates carrier leak adjustment in response to the adjustment start signal. During carrier leak adjustment, controller 41 outputs a signal for changing selection at switches 22 and 28, a signal for controlling the oscillating frequency of local oscillator 27, and a signal indicating a DC offset correction value to DC offset adjusters 24*a* and 24*b* in order to control each component. Details of the operation will be described later. Upon completion of carrier leak adjustment, controller 41 outputs a signal indicating the completion of the adjustment (adjustment end signal).

Details of the carrier leak adjustment operation performed by the radio communication apparatus in the present example will be described below.

Upon power-on of the radio communication apparatus or in response to a carrier leak adjustment request, an adjustment start signal is input in controller 41, which then initiates carrier leak adjustment operation.

Figure 5:
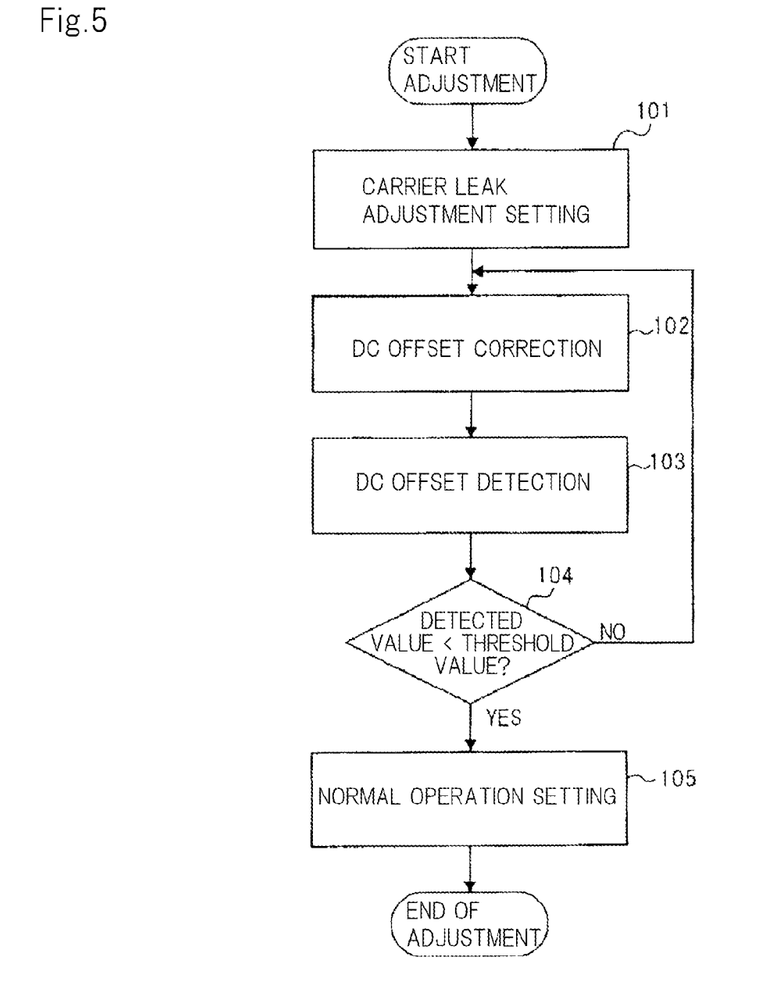
FIG. 5 is a flowchart illustrating an operation of the radio communication apparatus during carrier leak adjustment.

FIG. 5 is a flowchart illustrating the operation of the radio communication apparatus for carrier leak adjustment. Referring to FIG. 5, controller 41 first makes settings for performing carrier leak adjustment (step 101). Specifically, controller 41 sends a control signal to switch 22 to cause switch 22 to select position A, thereby allowing a signal for adjustment to be input from pattern generator 21 into filter 23. Controller 41 also sends a control signal to switch 28 to cause switch 28 to select position A to allow a signal output from quadrature modulator 6 to be fed back to quadrature demodulator 12. Further, controller 41 sends a control signal to local oscillator 27 to direct local oscillator 27 to oscillate at a preset frequency for carrier leak adjustment ($\omega c + \omega 1$). Controller 41 sets initial values for DC offset adjusters 24*a* and 24*b*.

Once the settings described above has been made, quadrature modulator 26 outputs a modulated wave resulting from modulation of a pattern generated by pattern generator 21. The modulated wave includes a carrier wave component ($\omega c + \omega 1$ or $\omega c - \omega 1$) having a frequency different from a carrier wave generated by local oscillator 31 at receiving side by a differential frequency $\omega 1$.

The modulated wave is input into quadrature demodulator 32 at the receiving side through switch 28. Quadrature demodulator 32 quadrature-demodulates the modulated wave by using a carrier wave generated by local oscillator 31 to generate I and Q baseband signals.

A frequency offset equivalent to the difference $\omega 1$ between the frequency of a carrier wave generated by local oscillator 27 at the transmitting side and the frequency of a carrier wave generated by local oscillator 31 at the receiving side remains in the signals output from quadrature demodulator 32. Accordingly, the carrier phases of the signals output from quadrature demodulator 32 are rotated by $\omega 1 t$.

The signals output from quadrature demodulator 32 are converted by AD converters 33*a* and 33*b* to digital signals and then input into the carrier recovery PLL. The rotation of the carrier phase is locked by the carrier recovery PLL. With this, the demodulation is completed.

Here, pattern detector 40 detects the pattern generated by pattern generator 21. Since there are four capture phases, pattern detector 40 determines which one of the capture phases is to be executed when carrier recovery is performed from the position of a signal point.

In the configuration that uses analog circuits for both quadrature modulation and demodulation as illustrated in FIG. 1, DC offsets that significantly affect the result of demodulation can be imparted in the section between DA converter 25 and quadrature modulator 26 at the transmitting side and in the section between quadrature demodulator 32 and AD converter 33 at receiving side. Herein, a DC offset generated at the transmitting side will be referred to as a first DC offset and a DC offset generated at the receiving side will be referred to as a second DC offset.

Correction of second DC offsets will be described first.

Figure 6:
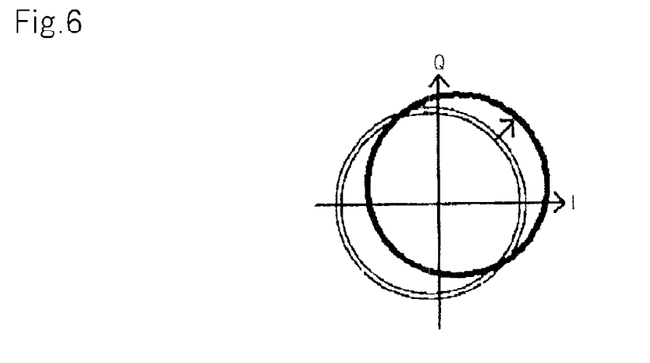
FIG. 6 illustrates a constellation of a signal input into automatic DC offset adjusters 34a, 34b.

A phase rotation $\omega 1t$ which is determined by a difference in frequency of the local oscillators remains in the signal output from quadrature demodulator 32. FIG. 6 illustrates a consternation of signals input in automatic DC offset adjusters 34$a$ and 34$b$. Assuming that the modulation scheme used is QPSK, signal points appear as a circle rotating by $\omega 1t$ as illustrated in FIG. 6. I and Q channel DC offsets generated between quadrature demodulator 32 and AD converters 33$a$ and 33$b$ appear as offsets along the I and Q axes. Consequently, the center of the circle of the consternation shifts from the origin. The second DC offsets appearing as shifts can be detected by calculating the average values of the signals along the axes. Automatic DC offset adjusters 34$a$ and 34$b$ detect the second DC offsets and automatically adjust the second DC offsets.

Figure 7:
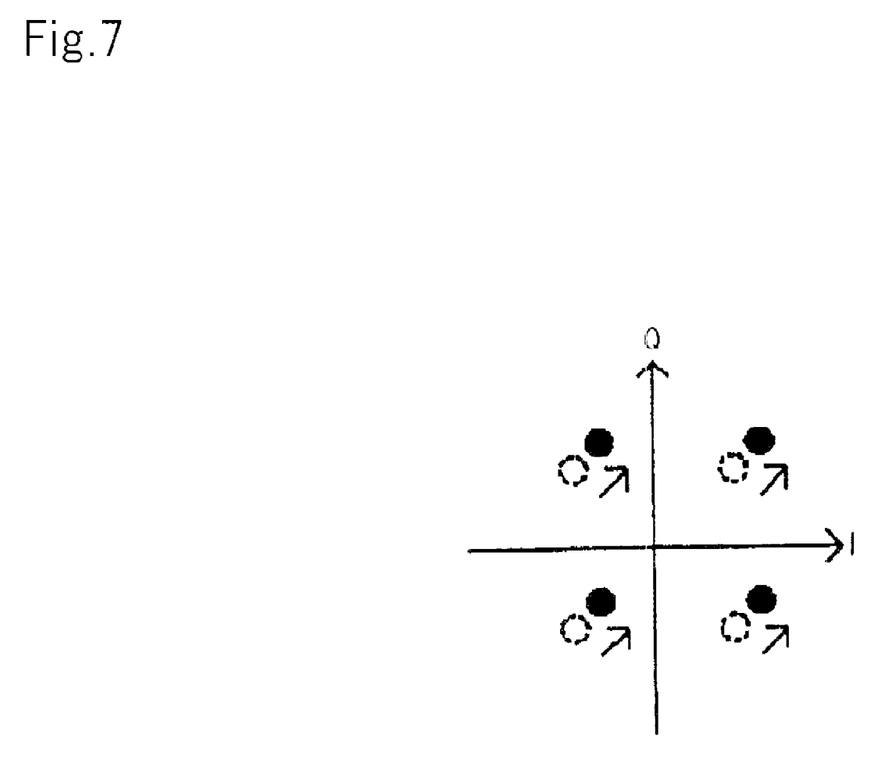
FIG. 7 illustrates a constellation of a signal input into automatic DC offset adjusters 36a, 36b.

The phase rotation of the signals from which the second DC offsets have been eliminated by automatic DC offset adjusters 34$a$ and 34$b$ is stopped by carrier recovery PLL. FIG. 7 illustrates a consternation of signals input into automatic DC offset adjusters 36$a$ and 36$b$. First DC offsets of the signal phase whose rotation has stopped appear as offsets of signal points along the I and Q axes as illustrated in FIG. 7.

The first DC offsets are corrected by automatic DC offset adjusters 36$a$ and 36$b$. Since the second DC offsets generated at the receiving side have already been corrected, control values (detected values) at automatic DC offset adjusters 36$a$ and 36$b$ directly represent offsets of quadrature modulator 26 at the transmitting side.

Each of demodulated I- and Q-axis values is a reproduction of any of the I and Q signals input into quadrature modulator 26. However, the demodulated I and Q signals have uncertainty because there are multiple carrier capture phases at 90 degrees from each other. That is, the value of the DC offset of each of the I and Q signals is a DC offset of any of the I and Q channel signals at the transmitting side or a DC offset of the opposite polarity.

Since local oscillator 27 at the transmitting side and local oscillator 31 at the receiving side differ in oscillating frequency, the first and second DC offsets can be distinguished from each other and adjusted as described above. If local oscillators 27 and 31 oscillate at the same frequency, the carrier frequency of a signal output from quadrature demodulator 32 will be 0 and the relationship between the vector of the first DC offset and the vector of the second DC offset will be fixed. If this is the case, the first and second DC offsets cannot be distinguished from each other.

If the frequencies of the two local oscillators 27 and 31 differ from each other by $\omega 1$, the first DC offset component rotates by $\omega 1t$ in the stage before carrier recovery and therefore the first DC offset disappears at a point where the input signal is time-averaged by automatic DC offset adjuster 34.

In the stage after carrier recovery, only the first DC offset can be seen by automatic DC offset adjuster 36 since the second DC offset has been eliminated by the correction by automatic DC offset adjuster 34. Automatic DC offset adjuster 36 needs only to correct the observable, first DC offset.

The carrier capture phase can be determined by pattern detection by pattern detector 40 on the basis of which of the I-channel and Q-channel signals at the transmitting side is equivalent to each of the I-channel and Q-channel signals output from complex multiplier 35. Therefore, controller 41 can obtain a control value to be provided to DC offset adjuster 24 on the basis of the control value of automatic DC offset adjuster 36 and the capture phase determined by pattern detector 40.

Controller 41 sets the control value at automatic DC offset adjuster 36 thus detected for DC offset adjuster 24 at the transmitting side (step 102).

Then, controller 41 waits for a period of time until the system becomes stable and then detects a control value at automatic DC offset controller 36 (step 103) and determines whether or not the detected control value (detected value) is smaller than a predetermined threshold value (step 104).

If the detected value is greater than or equal to the threshold value, controller 41 returns to step 102 and repeats the process. On the other hand, if the detected value is smaller than the threshold value, controller 41 determines that the first DC offset has been sufficiently corrected, that is, carrier leak has been corrected. In this case, controller 41 outputs an adjustment end signal to reset the settings on the components to the settings for normal operation (step 105). At this time point, switches 22 and 28 are turned to position B, which is the normal setting. Local oscillator 27 is set so as to oscillate at frequency $\omega c$.

The sequence of operations of the radio communication apparatus illustrated in the flowchart of FIG. 5 are controlled by controller 41. Controller 41 may be implemented by a processor executing a software program.

SECOND EXAMPLE

While both the quadrature modulator and demodulator are implemented by analog circuits in the first example illustrated in FIG. 2, quadrature demodulation in a second example described below is digitally performed. Since an analog signal output from a quadrature demodulator at the receiving side is not converted to a digital signal in the present example, inherently there is not a second DC offset. Accordingly, the radio communication apparatus of the second example does not include equivalents to automatic DC offset adjusters 34$a$ and 34$b$ illustrated in FIG. 2.

Figure 8:
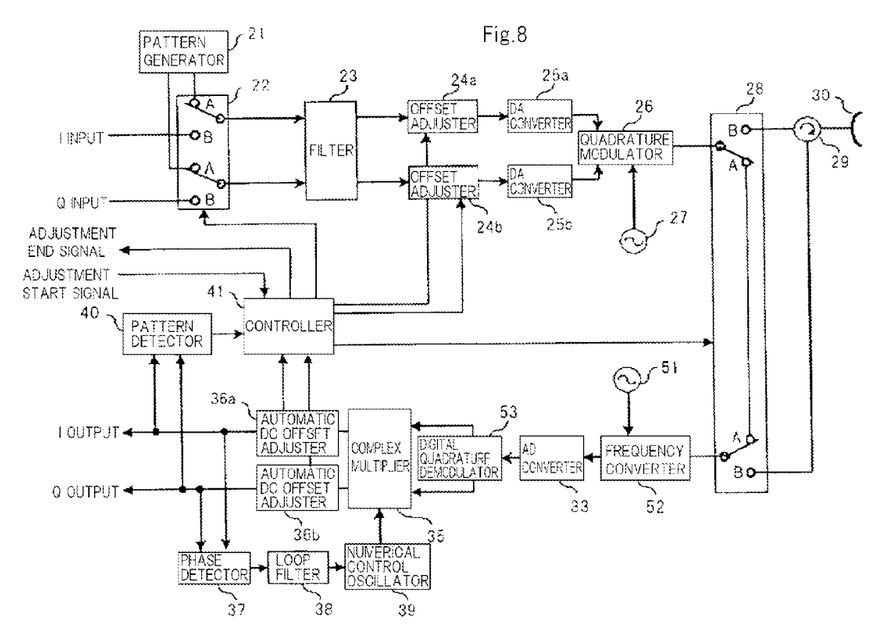
FIG. 8 is a block diagram illustrating a configuration of a radio communication apparatus in a second example.

FIG. 8 is a block diagram illustrating a configuration of the radio communication apparatus of the second example. Referring to FIG. 8, the radio communication apparatus includes pattern generator 21, switch 22, filter 23, offset adjusters 24$a$ and 24$b$, DA converters 25$a$ and 25$b$, quadrature modulator 26, local oscillator 27, switch 28, directional coupler 29, antenna 30, local oscillator 51, frequency converter 52, AD converter 33, digital quadrature demodulator 53, complex multiplier 35, automatic DC offset adjusters 36$a$ and 36$b$, carrier phase detector 37, loop filter 38, numerical control oscillator 39, pattern detector 40, and controller 41.

Pattern generator 21, switch 22, filter 23, offset adjusters 24$a$ and 24$b$, DA converters 25$a$ and 25$b$, quadrature modulator 26, local oscillator 27, switch 28, directional coupler 29, antenna 30, complex multiplier 35, automatic DC offset adjusters 36$a$ and 36$b$, carrier phase detector 37, loop filter 38, numerical control oscillator 39, pattern detector 40, and controller 41 are the same as those in the first example.

Local oscillator 51 generates a carrier wave having a frequency ωc that is used in frequency conversion. Frequency converter 53 converts the frequency of a signal from switch 28 by using the carrier wave from local oscillator 51. AD converter 33 converts the analog IF signal resulting from the frequency conversion by frequency converter 52 to a digital signal and sends the digital signal to digital quadrature demodulator 53.

Digital quadrature demodulator 53 quadrature-demodulates the input IF signal by digital processing and sends the resulting I-channel and Q-channel baseband signals to complex multiplier 35.

THIRD EXAMPLE

In the first example described above, pattern generator 21 which outputs a signal of a predetermined pattern and pattern detector 40 which detects the signal are used to determine a carrier capture phase. In a third example, the capture phase is determined in a different way. A radio communication apparatus in the third example uses rotational symmetry mapping and differential conversion. Such a system is often used with the QAM scheme.

Figure 9:
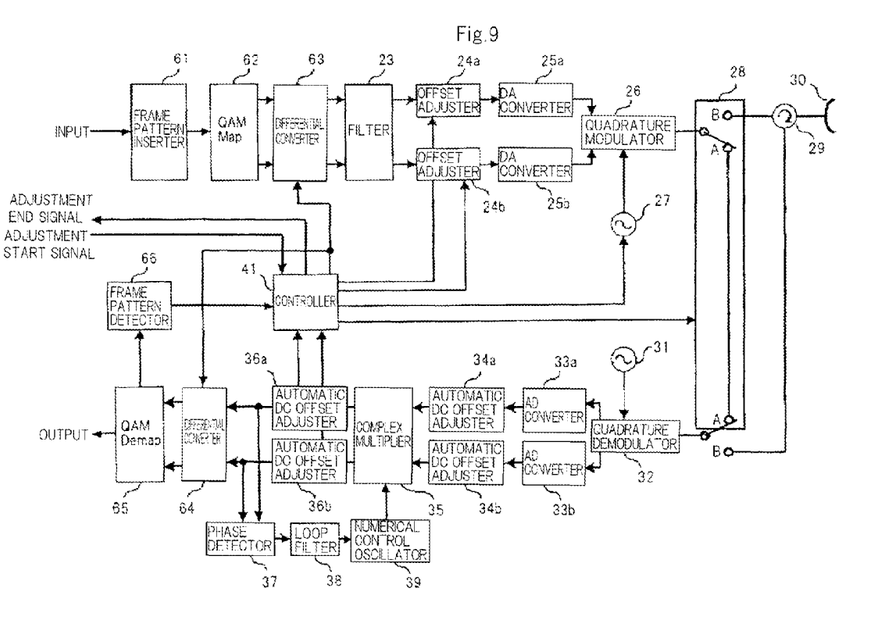
FIG. 9 is a block diagram illustrating a configuration of a radio communication apparatus in a third example.

FIG. 9 is a block diagram illustrating a configuration of the radio communication apparatus of a third example. Referring to FIG. 9, the radio communication apparatus includes frame pattern inserter 61, QAM mapping circuit 62, differential converter 63, filter 23, offset adjusters 24a and 24b, DA converter 25a and 25b, quadrature modulator 26, local oscillator 27, switch 28, directional coupler 29, antenna 30, local oscillator 31, quadrature demodulator 32, AD converters 33a and 33b, automatic DC offset adjusters 34a and 34b, complex multiplier 35, automatic DC offset adjusters 36a and 36b, carrier phase detector 37, loop filter 38, numerical control oscillator 39, differential converter 64, QAM demapping circuit 65, frame pattern detector 66, and controller 41.

Filter 23, offset adjusters 24a and 24b, DA converters 25a and 25b, quadrature modulator 26, local oscillator 27, switch 28, directional coupler 29, antenna 30, local oscillator 31, quadrature demodulator 32, AD converters 33a and 33b, automatic DC offset adjusters 34a and 34b, complex multiplier 35, automatic DC offset adjusters 36a and 36b, carrier phase detector 37, loop filter 38, numerical control oscillator 39, and controller 41 are the same as those in the first example illustrated in FIG. 2.

Frame pattern inserter 61 inserts a predetermined fixed pattern (frame pattern) at regular intervals in data input from a source external to the apparatus and that is to be transmitted, and provides the data to QAM mapping circuit 62. At receiving side, the frame pattern can be detected to identify the frame structure of the transmission data.

QAM mapping circuit 62 maps the signal into which the frame pattern has been inserted to a rotational symmetry QAM constellation.

Differential converter 63 controls execution and stopping of differential conversion according to a control signal from controller 41. When performing differential conversion, differential converter 63 calculates the difference between adjacent symbols for the top signal path mapped to the QAM constellation and sends the difference. The receiving side performs the reverse of the operation to eliminate uncertainty of carrier capture. This method is commonly used in the QAM scheme. When differential converter 63 does not perform differential conversion, differential converter 63 outputs an input signal as is. The output from differential converter 63 is provided to filter 23.

At the receiving side, outputs from automatic DC offset adjusters 36a and 36b are input into differential converter 64.

Differential converter 64 controls execution and stopping of differential conversion according to a control signal from controller 41. Differential converter 64 performs the reverse of the operation of differential converter 63 at the transmitting side on an input signal. The output from differential converter 64 is provided to QAM demapping circuit 65.

QAM demapping circuit 65 performs processing for demapping a signal mapped by QAM mapping circuit 62 at the transmitting side.

Figure 10:
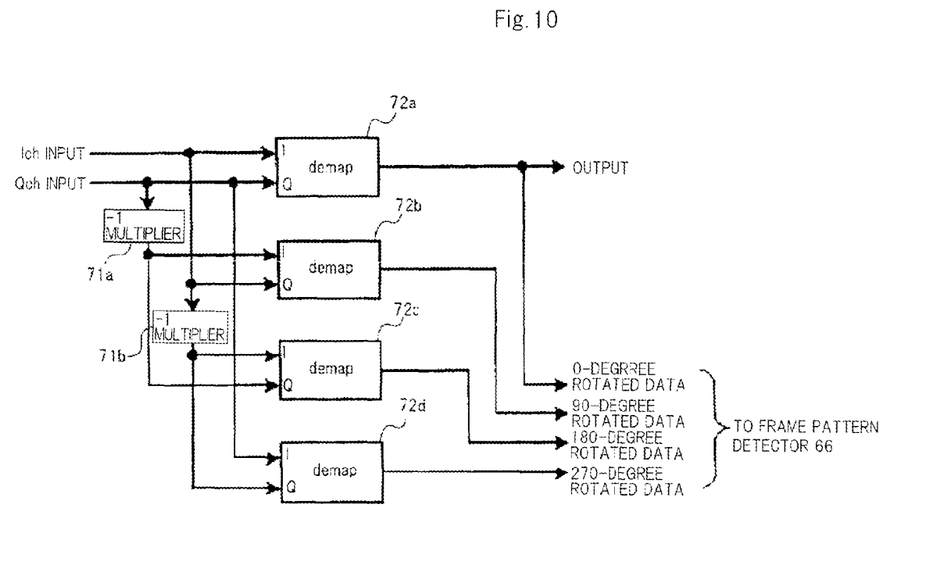
FIG. 10 is a block diagram illustrating a configuration of a QAM demapping circuit.

FIG. 10 is a block diagram illustrating a configuration of the QAM demapping circuit. Referring to FIG. 10, QAM demapping circuit 65 includes −1 multiplier circuits 71a and 71b and demapping circuits 72a to 72d. I- and Q-channel signals are input into QAM demapping circuit 65.

−1 multiplier circuit 71 multiplies an input Q-channel signal by −1. −1 multiplier 71b multiplies an input I-channel signal by −1.

Demapping circuit 72a uses the input I-channel signal as an input in the I channel and the input Q-channel signal as an input in the Q channel to perform processing for demapping the QAM. The output from demapping circuit 72a is 0-degree rotated data.

Demapping circuit 72b uses the input I-channel signal as an input in the Q channel and the input Q-channel signal multiplied by −1 as an input in the I channel to perform processing for demapping the QAM. The output from demapping circuit 72b is 90-degree rotated data.

Demapping circuit 72c uses the input I-channel signal multiplied by −1 as an input in the I channel and the input Q-channel signal multiplied by −1 as an input in the Q channel to perform processing for demapping the QAM. The output from demapping circuit 72c is 180-degree rotated data.

Demapping circuit 72d uses the input I-channel signal multiplied by −1 as an input in the Q channel and the input Q-channel signal as an input in the I channel to perform processing for demapping the QAM. The output from demapping circuit 72d is 270-degree rotated data.

The demapped signals in the four phases output from demapping circuits 72a to 72d are provided to frame pattern detector 66.

Frame pattern detector 66 detects a frame pattern from the demapped signals in the four phases provided from QAM demapping circuit 65 and notifies the phase from which the frame pattern has been detected to controller 41 as the carrier phase.

A carrier leak adjustment operation performed by the radio communication apparatus in this example will be described.

When an adjustment start signal is input, controller 41 sends a control signal to direct differential converter 63 at the transmitting side and differential converter 64 at the receiving side to stop differential conversion. The purpose of this is to allow the carrier recovery phase to be determined. Controller 41 sets initial values for offset adjusters 24a and 24b. Furthermore, controller 41 sends a control signal to direct local oscillator 27 at the transmitting side to oscillate at a preset frequency for carrier leak adjustment ((ωc+ω1) or (ωc−ω1)). Controller 41 also sends a control signal to cause switch 28 to select position A.

Once controller 41 has made the settings described above, a carrier is recovered in a predetermined carrier phase at the receiving side. Frame pattern detector 66 performs frame pattern detection on the signals in the four phases provided from QAM demapping circuit 65. The phase of the signal in which the frame pattern is detected is determined as the carrier recovery phase. Since the carrier recovery phase is determined at this time point, it can be determined which of the DC offsets at the inputs of quadrature modulator 26 is equivalent to the control values of automatic DC offset adjusters 36a and 36b. By setting the values of DC offsets to be corrected at offset adjusters 24a and 24b based on the determination as in the first example, carrier leak can be adjusted.

The methods for determining the carrier phase described with respect to the first and third examples are illustrative only and other determination methods can be used. For example, in a system that does not use differential conversion for carrier recovery phase detection, a carrier phase that is detected by a method that can be used in the system may be used.

Having described the present invention with respect to an exemplary embodiment and examples, it should be understood that the present invention is not limited to the exemplary embodiment and examples. Various modifications that can be understood by those skilled in the art can be made to the configurations and details of the present invention defined in the claims without departing form the scope of the invention.

This application is based upon and claims the benefit of priority from the prior Japanese Patent Application No. 2007-318444, filed on Dec. 10, 2007, the entire contents of which are incorporated herein by reference.

The invention claimed is:

1. A radio communication apparatus comprising:
    a quadrature modulator that quadrature-modulates an outgoing signal by using a carrier wave having a frequency different from a frequency at a receiving side during carrier leak adjustment;
    a feedback unit that feeds a modulated wave resulting from the quadrature modulation by the quadrature modulator back to the receiving side;
    a quadrature demodulator that quadrature-demodulates the modulated wave fed back by the feedback unit;
    a phase locker that locks a phase of a signal resulting from the quadrature demodulation by the quadrature demodulator to match the phase to a phase at the transmitting side;
    an offset detector that detects a direct-current offset by time-averaging the signal with a phase locked by the phase locker;
    a first offset adjuster that, on the basis of the value of the direct-current offset detected by the offset detector, corrects a direct-current offset of the outgoing signal to be quadrature-modulated by the quadrature modulator;
    a third offset adjustor that corrects a direct-current offset of the signal on the basis of a value of a direct-current offset detected in the signal with the phase locked by the phase locker;
    a pattern generator that generates a predetermined pattern to be input into the direct-current modulator during carrier leak adjustment; and
    a pattern detector that detects the pattern in a signal in which a direct-current offset has been corrected by the third offset adjuster to determine a carrier recovery phase.

2. The radio communication apparatus according to claim 1, further comprising second offset adjuster that detects a direct-current offset by time-averaging a signal obtained by the quadrature modulator, corrects a direct-current offset of the signal on the basis of a detected value, and sends the corrected signal to the phase locker.

3. The radio communication apparatus according claim 1, wherein the offset detector also acts as the third offset adjuster.

4. The radio communication apparatus according to claim 1, wherein, during carrier leak adjustment, a signal of the pattern generated by the pattern generator is used as the outgoing signal to be quadrature-modulated by the quadrature modulator, and the pattern detector determines as a carrier recovery phase a phase in which the pattern has been detected.

5. The radio communication apparatus according to claim 1, wherein the pattern generated by the pattern generator is inserted in the outgoing signal at regular intervals and the pattern detector determines as a carrier recovery phase a phase in which the pattern inserted at regular intervals has been detected.

6. The radio communication apparatus according to claim 5, further comprising:
    a mapping unit that rotational symmetry maps a signal in which the pattern has been inserted;
    a first differential converter that calculates the difference between adjacent symbols for the top path of the signal resulting from the mapping by the mapping unit and sends the difference as the outgoing signal to be quadrature-modulated by the quadrature modulator;
    a second differential convertor that performs the reverse of the operation performed by the first differential convertor on an output from the third offset adjustor and outputs the resulting output; and
    a demapping unit that rotational-symmetry-demapps an output from the second differential convertor and sends the resulting signal to the pattern detector;
    wherein, during carrier leak adjustment, the first differential convertor and second differential convertor stop signal conversion operations.

7. The radio communication apparatus according to claim 1, further comprising a controller that causes the first offset adjustor to repeat the direct-current offset correction and causes the offset detector to repeat the direct-current offset detection until a direct-current offset detected by the offset detector after direct-current offset correction by the first offset adjustor becomes smaller than a predetermined threshold value.

8. A direct-current offset adjustment method for adjusting a direct-current offset within an apparatus, comprising:
    at a transmitting side,
        quadrature-modulating an outgoing signal by using a carrier wave having a frequency different from a frequency at an receiving side during carrier leak adjustment; and
        feeding a modulated wave resulting from the quadrature modulation back to the receiving side;
    at the receiving side,
        quadrature-demodulating the fed back modulated wave;
        locking a phase of a signal resulting from the quadrature demodulation to match the phase of the signal to a phase at the transmitting side; and
        detecting a direct-current offset by time-averaging the phase locked signal; and
    at the transmitting side,
        correcting, on the basis of the value of the direct-current offset detected at the receiving side, a direct-current offset of the outgoing signal to be quadrature-modulated;
    wherein,
        at the transmitting side, a predetermined pattern is generated and used in the outgoing signal;
        at the receiving side,
            the direct-current offset detected in the phase-locked signal is notified to the transmitting side and a direct-current offset of the signal is corrected on the basis of the direct-current offset; and the pattern is detected in the signal in which the direct-current offset has been corrected to determine a carrier recovery phase.

9. The direct-current offset adjustment method according to claim 8, wherein
at the receiving side,
the signal resulting from quadrature demodulation is time-averaged to detect a direct-current offset, a direct-current offset is corrected on the basis of the detected value, and processing is performed on the signal in which the direct-current offset has been corrected to lock the phase of the signal.

10. The direct-current offset adjustment method according to claim 8, wherein:
at the transmitting side, a signal of the generated pattern is used as the outgoing signal during carrier leak adjustment; and
at the receiving side, a phase in which the pattern has been detected is determined as a carrier recovery phase.

11. The direct-current offset adjustment method according to claim 8, wherein:
at the transmitting side, the generated pattern is inserted in the outgoing signal at regular intervals; and
at the receiving side, a phase in which the pattern inserted at the regular intervals has been detected is determined as a carrier recovery phase.

12. The direct-current offset adjustment method according to claim 11, wherein:
at the transmitting side,
a signal in which the pattern has been inserted is rotational-symmetry-mapped;
a differential conversion operation is performed on the signal resulting from the rotational-symmetry-mapping to calculate the difference between adjacent symbols for the top path of the signal and the resulting signal is quadrature-modulated as the outgoing signal;
at the receiving side,
the reverse of the differential conversion operation is performed on the signal in which a direct-current offset has been corrected and the signal is rotational-symmetry-demapped to detect the pattern in the signal resulting from the rotational-symmetry-demapping; and
during carrier leak adjustment, the differential conversion operation and the reverse of the differential conversion operation are stopped.

13. The direct-current offset adjustment method according to claim 8, wherein:
direct-current offset correction at the transmitting side and direct-current offset detection at the receiving side are repeated until a direct-current offset detected at the receiving side after direct-current offset correction at the transmitting side becomes smaller than a predetermined threshold value.

* * * * *